Jan. 6, 1948. A. I. ALSTROM 2,433,881
STATOR MOUNTING FOR FLYWHEEL MAGNETOS
Filed Aug. 11, 1944
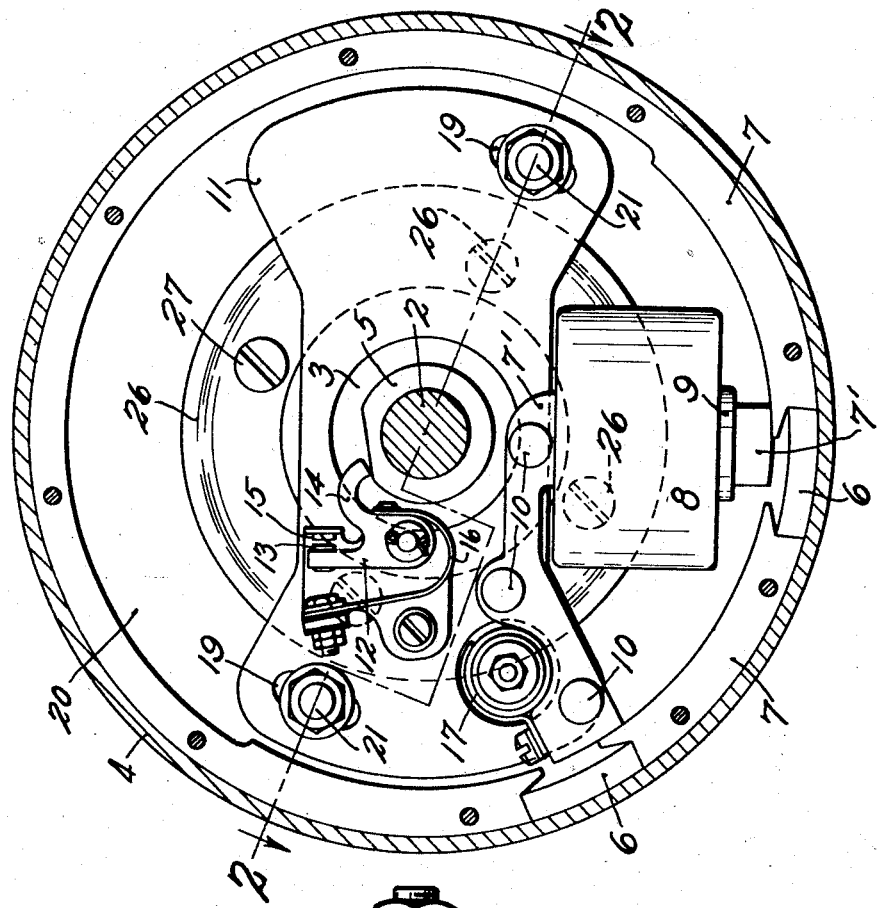
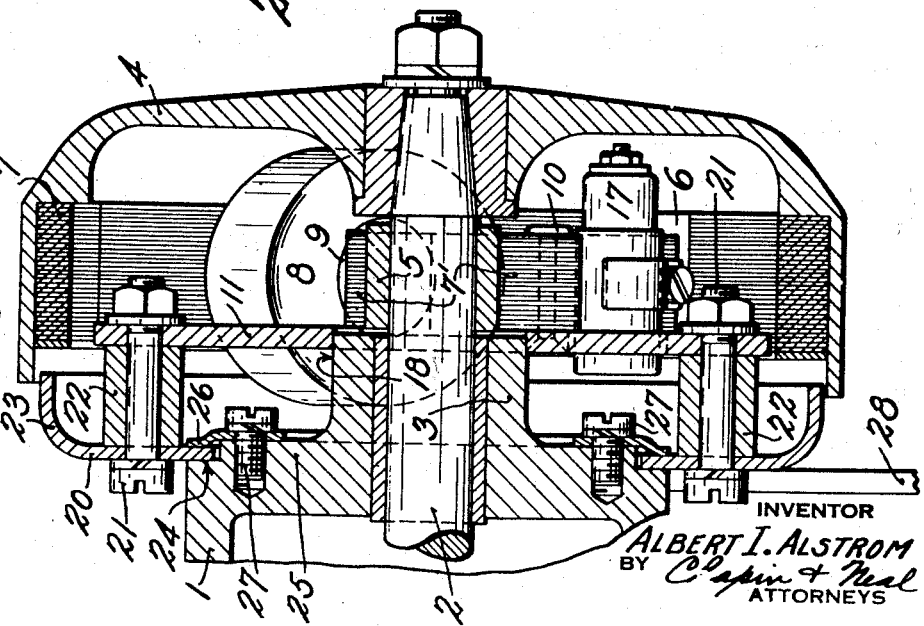
INVENTOR
ALBERT I. ALSTROM
BY Chapin + Neal
ATTORNEYS Patented Jan. 6, 1948

2,433,881

UNITED STATES PATENT OFFICE 2,433,881

STATOR MOUNTING FOR FLYWHEEL MAGNETOS

Albert I. Alstrom, Longmeadow, Mass., assignor to Wico Electric Company, West Springfield, Mass., a corporation of Massachusetts Application August 11, 1944, Serial No. 549,101

4 Claims. (Cl. 123—149)

This invention relates to an improved mounting for the stator of flywheel magnetos which are to be used on engines of the variable spark type, as distinguished from the fixed spark type.

An outboard motor is an example of an engine of the type described and one for which the present invention is especially adapted. In an engine of this type, the stator of the magneto has to be swung around the axis of the crankshaft through a wide angular range, sometimes as much as ninety degrees, in order to get the desired spark control. It has been customary, heretofore, to mount the stator plate of the magneto on a hub on the engine crankshaft by means of a split hub on the stator plate which split hub encircles the crankcase hub and is frictionally held thereto by a screw which draws the split portions of the hub together. The stator plate has a handle projecting outwardly therefrom and the operator can swing the stator plate and turn the split hub on the crankcase hub. Necessarily this arrangement does not give a rigid mounting of the stator plate—first, because the securing means (the screw in the split hub) is so close to the axis of revolution and, second, because the split hub cannot be clamped so tightly on the crankcase hub as to prevent the desired movement of the stator plate. Moreover, it is important to have the stator plate located accurately in coaxial relation with the engine crankshaft and, obviously, the split hub, rotatably mounted on the crankcase hub, cannot be relied on to secure the desired accurate relationship of these parts.

This invention has for an object to provide a stator plate, which is rotatably mounted with a pilot bearing on a hub of the engine crankcase and accurately located relatively to the engine crankcase, and a means independent of the pilot hub bearing, for frictionally holding the stator plate to the engine crankcase in various positions of angular adjustment and for enabling the wide range of angular movement of the stator plate for spark control—said means being radially spaced from the axis of the crankshaft by a distance substantially greater than the diameter of the pilot hub on the crankcase—the better to secure rigidity of the mounting.

The invention has for another object the provision of an adapter which can be secured to the stator plate of a standard magneto such as is designed for use with a fixed-spark type of engine in order to convert the stator plate for use with a variable spark type of engine.

The invention has for a further object the provision of an adapter which may be fixed to the stator plate of the magneto at various distances therefrom (measured parallel to the crankshaft axis) to compensate for variations in different engines in the distance between the outer end of the crankcase hub and the adjacent wall of the crankcase.

The invention will be disclosed with reference to the accompanying drawing, in which Fig. 1 is a sectional elevational view of a flywheel magneto embodying the invention; and Fig. 2 is a sectional view taken on the line 2—2 of Fig. 1.

Referring to these drawings: in Fig. 2, 1 represents the engine crankcase and 2 its crankshaft which extends outwardly through a bearing in hub 3 and beyond the latter to carry a flywheel 4 and, between the hub of the flywheel and hub 3, a breaker point cam 5. The flywheel (Fig. 1) has fixed thereto the magnets 6 and connecting pole shoe laminations 7 of the magnetic rotor. The stator includes a laminated core 7', which carries primary and secondary coils 8 and 9, respectively, and the ends of which are arranged to cooperate with the pole shoes of the rotor. The core 7' is suitably fixed, as by the rivets 10, to a stator plate 11. Also mounted on this plate is the breaker point mechanism including the breaker lever 12, with its breaker point 13 and follower 14 for riding on cam 5, the fixed breaker point 15 and the spring 16 for lever 12. The condenser 17 is also fixed to plate 11. Further description of the magnetic and electrical elements of the magneto is thought unnecessary to an understanding of the present invention.

The stator plate 11, as herein shown, is the standard type used in magnetos which are intended to be mounted on engines of the fixed spark type. It has a central hole, accurately finished, which closely fits an accurately finished exterior surface 18 on hub 3. This provides a pilot bearing to insure that the pole shoes of the stator are located with close accuracy in coaxial relation with the pole shoes of the magnetic rotor. The stator plate 11 has one near each end thereof a slot 19 (Fig. 1), coaxial with shaft 2, to receive retaining screws, whereby the plate is fixed to a wall of the engine crankcase in a manner to enable limited angular adjustment, as shown for example, in Harmon Patent No. 2,101,-392, granted Dec. 7, 1937. According to normal usage, as disclosed in said patent, these retaining screws are set up tight after the stator plate has been adjusted to the proper angular position and the stator plate cannot subsequently be turned on the crankshaft hub from a position outside the flywheel during operation of the engine.

To adapt the stator plate 11 for use with an engine of the variable spark type, an adapter plate 20 is used. This plate, which is of annular form, is secured to plate 11 by bolts 21. These bolts pass through the slots 19 in plate 11, through holes in plate 20 and through interposed spacer sleeves 22 which hold the two plates properly spaced. The outer edge of plate 20 desirably cooperates with the inner end of the flywheel rim to form an enclosure for the magneto—the plate 20 in this case having a curved rim 23 (Fig. 2) for this purpose. The plate 20 is held against a finished flat surface 24 on an end wall 25 of the engine crankcase by an annular ring 26 which is fixed to wall 25 by cap screws 27. This ring bears on plate 20 with spring pressure and frictionally holds it in any angular position to which it may be moved by the control handle 28, which is secured to plate 20.

In different engines, the length of hub 3 may vary and the length of the spacer sleeves 22 and the length of bolts 21 may be changed to locate the adapter against an end wall of the crankcase.

In assembling the parts, the adapter plate 20 is first put in place and then the spring ring 26 is fastened in place by the screws 27 to hold the adapter. The stator plate 11, with all stator elements previously mounted thereon, is then mounted on its pilot bearing 18 and the sleeves 22 and bolts 21 are applied to clamp the plates 11 and 20 together. The flywheel is then put in place to complete the assembly.

The invention enables the stator plate to be mounted on the engine crankcase in a manner to permit the desired wide range of angular adjustment and yet retain the accuracy of alignment of the cooperating magnetic parts of the stator and rotor by the use of an accurate pilot bearing support for the plate. The mounting, while enabling angular adjustment of the stator, also affords a relatively rigid stable support due to the location of the screws 27 at as great a radial distance as possible from the crankcase hub 3. It will be clear that the plate 20 is firmly held by spring pressure against the surface 24 and cannot move laterally so that the stator plate 11 is also restrained from lateral movement and cannot readily be rocked on its pilot hub bearing as is possible with the prior art mounting above described.

The invention enables the magneto manufacturer to use the one type of flywheel magneto on both the fixed spark type and variable spark type of engine. All that is necessary to adapt the stator plate of the magneto for mounting on an engine of the variable spark type is to use the adapter 20, spring ring 26, two bolts 21, two spacer sleeves 22 and a few cap screws 27. The adapter 20 and ring 26 may readily be stampings, capable of being made in quantities at low unit cost, and the other elements are standard and relatively inexpensive parts.

I claim:

1. The combination with an internal combustion engine and its crankshaft and crankcase, the latter having an outer end wall and a hub projecting outwardly from the end wall and providing a bearing for the crankshaft, said hub having at least a portion of its exterior periphery located in true coaxial relation with the crankshaft, said end wall having a surface surrounding the hub and located in true normal relation with the axis of the crankshaft, of a magneto rotor fixed to the crankshaft and including pole shoes, a magneto stator including pole pieces to cooperate with said pole shoes during rotation of the rotor, a plate supporting said stator and having a pilot bearing directly on said portion of the external periphery of the hub to locate the stator pole pieces coaxially of the rotor pole shoes, an adapter plate fixed to and spaced rearwardly from the stator plate and engaging said surface, and means attached to said wall at points radially spaced from said axis by a distance substantially greater than the radius of the exterior periphery of said hub for holding the adapter plate against said surface and enabling it to move about said axis through a wide range.

2. The combination with an internal combustion engine and its crankshaft and crankcase, the latter having an outer end wall and a hub projecting outwardly from the end wall and providing a bearing for the crankshaft, said hub having at least a portion of its exterior periphery located in true coaxial relation with the crankshaft, said end wall having a surface surrounding the hub and located in true normal relation with the axis of the crankshaft, of a magneto rotor fixed to the crankshaft and including pole shoes, a magneto stator including pole pieces to cooperate with said pole shoes during rotation of the rotor, a plate supporting said stator and having a pilot bearing directly on said portion of the external periphery of the hub to locate the stator pole pieces coaxially of the rotor pole shoes, an annular adapter plate fixed to and spaced rearwardly from the stator plate and engaging said surface, an annular ring fixed to said wall at points spaced from said axis by a distance substantially greater than the radius of the external periphery of said hub and partially overlapping and resiliently engaging the adapter plate to yieldingly hold the latter in various angular positions to which it may be moved and enable angular movement of the adapter plate throughout a wide range.

3. The combination with an internal combustion engine and its crankshaft and crankcase, the latter having an outer end wall and a hub projecting outwardly from the end wall and providing a bearing for the crankshaft, said hub having at least a portion of its exterior periphery located in true coaxial relation with the crankshaft, said end wall having a surface surrounding the hub and located in true normal relation with the axis of the crankshaft, of a magneto rotor fixed to the crankshaft and including pole shoes, a magneto stator including pole pieces to cooperate with said pole shoes during rotation of the rotor, a plate supporting said stator and having a pilot bearing directly on said portion of the external periphery of the hub to locate the stator pole pieces coaxially of the rotor pole shoes, an adapter plate spaced rearwardly from the stator plate and engaging said surface, spacer sleeves between said plates, bolts passing through said plates and sleeves to fix the plates together in proper axially-spaced relation, and means attached to said wall at points radially spaced from said axis by a distance substantially greater than the radius of the exterior periphery of said hub for holding the adapter plate against said surface and enabling it to move about said axis throughout a wide range.

4. The combination with an internal combustion engine and its crankshaft and crankcase, the latter having an outer end wall and a hub projecting outwardly from the end wall and providing a bearing for the crankshaft, said hub having at least a portion of its exterior periphery located in true coaxial relation with the crankshaft, said end wall having a surface surrounding the hub and located in true normal relation with the axis of the crankshaft, of a substantially cup-shaped flywheel fixed to said crankshaft with its open end toward said wall, a magneto rotor fixed in the flywheel and having pole shoes, a magneto stator located inside the flywheel and having pole pieces to cooperate with said pole shoes during rotation of the rotor, a plate located inside said flywheel supporting said stator and having a pilot bearing directly on said portion of the external periphery of the hub to locate the stator pole pieces coaxially of the rotor pole shoes, an adapter plate fixed to and spaced rearwardly from the stator plate and engaging said surface, the outer edge of said adapter plate cooperating with the rim of the flywheel to close the opening therein and enclose said rotor and stator, and means attached to said wall at points radially spaced from said axis by a distance substantially greater than the radius of the exterior periphery of said hub for holding the adapter plate against said surface and enabling it to move about said axis through a wide range.

ALBERT I. ALSTROM.

REFERENCES CITED

The following references are of record in the file of this patent:

UNITED STATES PATENTS

| Number | Name | Date |
|---|---|---|
| 1,283,373 | Van Deventer | Oct. 29, 1918 |
| 1,939,608 | Lansing | Dec. 12, 1933 |
| 1,975,644 | Lesage | Oct. 2, 1934 |
| 2,101,392 | Harmon | Dec. 7, 1937 |